C. E. PATRIC.
FURROW OPENER FOR SEEDING MACHINES.
APPLICATION FILED MAY 29, 1916.
1,254,266. Patented Jan. 22, 1918.
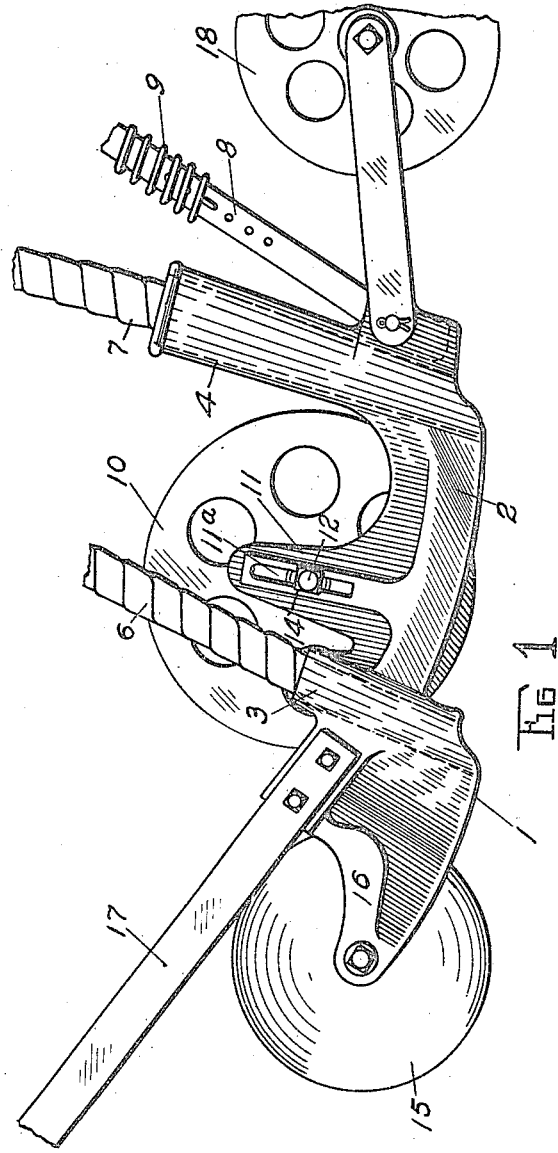
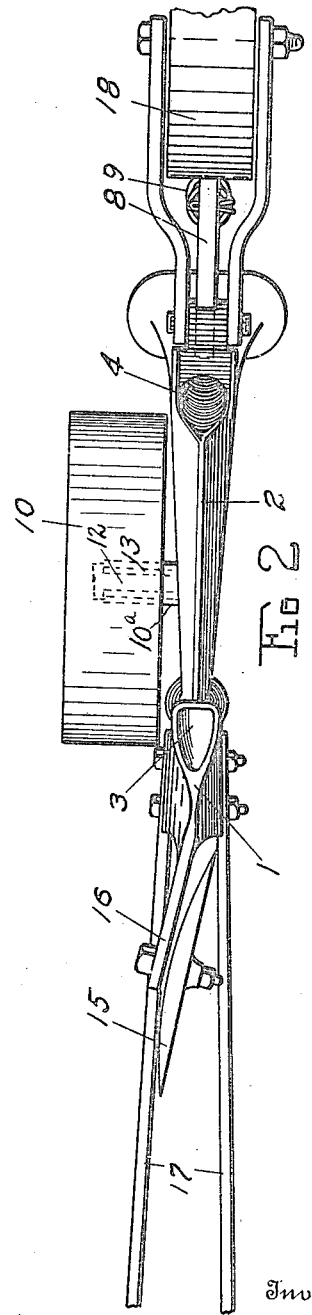

UNITED STATES PATENT OFFICE.

CHARLES E. PATRIC, OF SPRINGFIELD, OHIO.

FURROW-OPENER FOR SEEDING-MACHINES.

1,254,266.        Specification of Letters Patent.        Patented Jan. 22, 1918.

Application filed May 29, 1916. Serial No. 100,540.

*To all whom it may concern:*

Be it known that I, CHARLES E. PATRIC, a citizen of the United States, residing at Springfield, in the county of Clark and State of Ohio, have invented certain new and useful Improvements in Furrow-Openers for Seeding-Machines, of which the following is a specification.

My invention relates to improvements in furrow openers for seeding machines, the invention relating more particularly to a furrow opener which will deposit seed and fertilizer simultaneously at different depths.

The object of the invention is to provide a furrow opener which will deposit seed and fertilizer simultaneously in such a way that the fertilizer will not come in direct contact with the seed, the fertilizer being deposited at a greater depth than the seed in such a way that there will be an intervening layer of earth between the fertilizer and seed so that the danger of the fertilizer interfering with the proper germination of the seed is eliminated.

A further object of the invention is to provide a furrow opener of the character described which will be simple in construction and effective in operation.

In the accompanying drawings:—

Figure 1 is a side elevation of a furrow opener embodying my improvements.

Fig. 2 is a bottom plan view of the same.

In carrying out my invention I employ two distinct furrow opening members of the shoe or runner type, preferably cast in one piece and in line with each other, 1 representing the furrow opening member for the fertilizer and 2 the furrow opening member for the seed. At the rear of the member 1 the casting is provided with a conduit 3 and at the rear of the member 2 is also an integrally formed conduit 4, flexible tubes 6 and 7 of the usual form connecting these conduits with the distributing devices, (not shown) in the hoppers of the machine. The furrow opening members are so disposed relative each other that the furrow opening portion of the member 1 is below that of the member 2 so that it will open a trench of greater depth in which the fertilizer is deposited. It will be observed that the forward portion of the furrow opener member 2 is located considerably above the ground line and is much narrower than the conduit 3, as a result of which there is a tendency for the walls of the furrow opened by the member 1 to fall in and cover the fertilizer after it has been deposited. The furrow opener member 2 then reopens the furrow to a less depth, due to its higher plane, for the deposit of the seed.

Pressure is applied to the furrow opener through the medium of the usual pressure rod 8 and spring 9 which extends to the usual raising and lowering and pressure applying devices (not shown) on the machine and the depth of planting is regulated by a gage wheel 10 which is adjustably secured to the integrally formed extension 11 which is provided with a slotted opening 11ª for the purpose of receiving the bolt 12 which extends through a loose sleeve 13 in the hub 10ª of the wheel (shown in dotted lines in Fig. 2); a nut 14 serving to clamp the sleeve firmly to the extension 11 so that the wheel will run loosely on the sleeve.

In order to break up the ground ahead of the furrow openers proper, I employ a concavo-convex disk 15 which is rotatably connected to a forwardly-extending angularly-arranged extension 16 so that the disk will stand at an angle to the line of travel. While this ground breaking disk is not absolutely necessary in soft ground, yet in hard ground it is found to be highly essential for the reason that it is impossible to make the shoes penetrate the hard ground to a sufficient extent without being first broken up and pulverized by the disk.

The furrow opener thus formed is provided with the usual drag-bars 17 connected to the forward portion of the casting constituting the furrow opening members, and a covering device, in the nature of a press wheel 18 is preferably employed, pivotally attached to the rear of the casting, which properly covers the fertilizer and seed.

Having thus described my invention, I claim:—

1. In a device of the character described, two connected furrow opening members arranged in line with each other relative to the line of travel, the forward member being arranged to open a furrow of greater depth than the other, and a ground breaking disk arranged ahead of said furrow opening members and supported thereby.

2. In a device of the character described, two connected furrow opening runners arranged in line with each other relative to the direction of travel, the forward runner being arranged in a lower plane than the rear runner so as to open a furrow of greater depth than said rear member, and a ground breaking disk arranged ahead of said runners and supported thereby.

3. In a device of the character described, a single casting having formed thereon two furrow opener runners arranged in line with each other relative to the line of travel, with the forward runner in a lower plane than the rear runner, said casting also having a conduit arranged at the rear of each runner, an integally-formed angularly-arranged projection at the foward end of said casting, and a disk rotatably connected with said projection.

4. In a device of the character described, a single casting having formed thereon two furrow opening runners arranged in line with each other relative to the line of travel, the forward runner being in a lower plane than the rear runner, said casting also having a conduit at the rear of each runner, the forward portion of the rear runner being connected to the conduit for the front runner at a point above the ground line and being narrower in width than said conduit.

5. In a device of the character described, a single casting having formed thereon two furrow opening runners arranged in line with each other relative to the line of travel, the forward runner being in a lower plane than the rear runner, said casting also having a conduit at the rear of each runner, the forward portion of the rear runner being connected to the conduit for the front runner at a point above the ground line and being narrower in width than said conduit, and a disk rotatably connected with the forward end of said casting.

In testimony whereof, I have hereunto set my hand this 25th day of May, 1916.

CHARLES E. PATRIC.

Witness:
  CHAS. I. WELCH.